(12) United States Patent
Winterling et al.

(10) Patent No.: US 8,268,955 B2
(45) Date of Patent: Sep. 18, 2012

(54) POLYAMIDES

(75) Inventors: Helmut Winterling, Ludwigshafen (DE); Jürgen Demeter, Ludwigshafen (DE); Kurt Krempel, Rödersheim-Gronau (DE)

(73) Assignee: BASF SE, Ludwigshafen (DE)

( * ) Notice: Subject to any disclaimer, the term of this patent is extended or adjusted under 35 U.S.C. 154(b) by 533 days.

(21) Appl. No.: 10/531,225

(22) PCT Filed: Oct. 28, 2003

(86) PCT No.: PCT/EP03/11931
§ 371 (c)(1),
(2), (4) Date: Apr. 13, 2005

(87) PCT Pub. No.: WO2004/039861
PCT Pub. Date: May 13, 2004

(65) Prior Publication Data
US 2006/0063907 A1   Mar. 23, 2006

(30) Foreign Application Priority Data
Oct. 30, 2002  (DE) .................................. 102 50 767

(51) Int. Cl.
*C08G 69/08* (2006.01)
(52) U.S. Cl. ........ 528/310; 528/323; 528/324; 528/325; 528/326
(58) Field of Classification Search .................. 528/310, 528/323, 324.325, 326
See application file for complete search history.

(56) References Cited

U.S. PATENT DOCUMENTS

| | | | | |
|---|---|---|---|---|
| 2,264,293 A * | 12/1941 | Brubaker | | 528/315 |
| 2,264,298 A * | 12/1941 | Brubaker et al. | | 267/289 |
| 3,663,511 A * | 5/1972 | Lombardi et al. | | 528/65 |
| 3,924,023 A * | 12/1975 | Boranian et al. | | 427/495 |
| 4,150,002 A * | 4/1979 | Drawert et al. | | 528/339.3 |
| 4,617,235 A * | 10/1986 | Shinonome et al. | | 428/374 |
| 4,745,161 A | 5/1988 | Saudek et al. | | |
| 4,963,639 A * | 10/1990 | Sato et al. | | 528/72 |
| 5,068,311 A * | 11/1991 | Horn et al. | | 528/324 |
| 5,278,249 A * | 1/1994 | Marrion | | 525/380 |
| 5,686,557 A | 11/1997 | Kiyohara et al. | | |
| 6,034,204 A * | 3/2000 | Mohr et al. | | 528/328 |
| 2002/0165334 A1 * | 11/2002 | Melchiors et al. | | 528/44 |
| 2004/0220378 A1 * | 11/2004 | Kuntimaddi et al. | | 528/329.1 |

FOREIGN PATENT DOCUMENTS

| | | | |
|---|---|---|---|
| EP | 0409093 | * | 7/1989 |
| EP | 1558668 | | 8/2005 |
| JP | 06033002 | | 8/1994 |

OTHER PUBLICATIONS

Yamamoto et al Electrodeposition coating composition, JPO Pub No. 06-033002.*
"The water management policies guidelines for province of Ontario", Ministry of environment and energy, Ontario, 1994.*

* cited by examiner

*Primary Examiner* — Gregory Listvoyb
(74) *Attorney, Agent, or Firm* — Connolly Bove Lodge & Hutz LLP

(57) ABSTRACT

Polyamide containing a compound which bears at least one hydroxy group and has chemical bonding by way of an amide group to the end of the polymer chain, process for preparing this polyamide, and also fibers, films, and moldings, comprising at least one such polyamide.

7 Claims, 2 Drawing Sheets

POLYAMIDES

CROSS REFERENCE TO RELATED APPLICATION

The present application is a National Stage application of PCT/EP2003/011931, filed Oct. 28, 2003, which claims priority from German Patent Application No. DE 102 50 767.8, filed Oct. 30, 2002.

The present invention relates to a polyamide containing a compound which bears at least one hydroxy group and has chemical bonding by way of an amide group to the end of the polymer chain.

It further relates to a process for preparing this polyamide, and to fibers, films, and moldings comprising at least one such polyamide.

Polyamides, in particular nylon-6, and nylon-6,6, are industrially significant polymers. They are usually prepared by reacting suitable monomers such as caprolactam, adipic acid, or hexamethylenediamine, in the presence of water.

Unless further measures are taken, this gives polyamides which during downstream steps of processing, such as injection molding, have a tendency to undergo uncontrolled molecular weight increase with a resultant impairment of processing properties. In particular, an increase in melt viscosity occurs (determined as a fall-off in the melt volume flow rate to EN ISO 1133), and in injection molding, for example, this leads to longer cycle time.

To stabilize the polyamide with respect to this type of uncontrolled molecular weight increase, it is usual to use chain regulators during the preparation of the polymer, an example being propionic acid.

These chain regulators can substantially suppress the molecular weight increase but in order to shorten cycle times in injection molding it is desirable to increase the melt volume flow rate of polyamides to EN ISO 1133 while the relative viscosity determined to DIN 51562-1 to -4, remains the same.

DETAILED DESCRIPTION OF THE INVENTION

Figure 1:
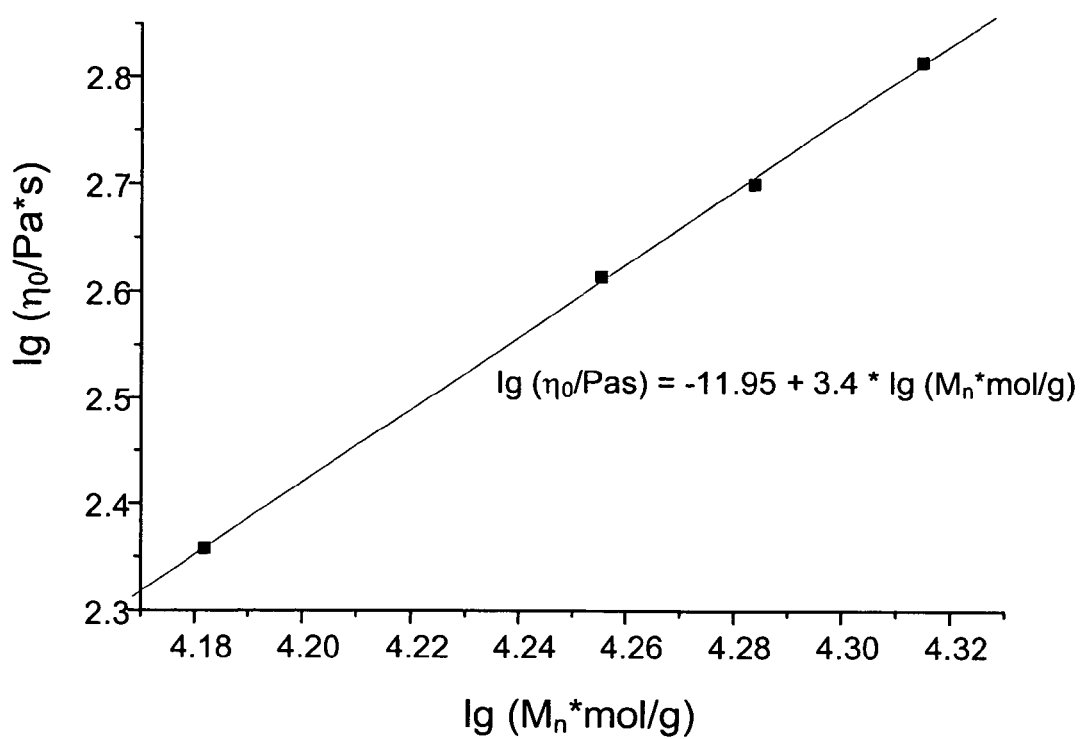
FIG. 1 shows that the polyamides prepared as in Example 1 are linear.

It is an object of the present invention to provide a process which, in a technically simple and cost-effective manner, permits the preparation of a polyamide which when compared with polyamides chain-regulated by conventional methods has higher melt volume flow rate to EN ISO 1133 while the relative viscosity determined to DIN 51562-1 to -4, remains the same.

We have found that this object is achieved by means of the polyamide defined at the outset, a process for its preparation, and fibers, films, and moldings, comprising at least one such polyamide.

For the purposes of the present invention, polyamides are homopolymers, copolymers, mixtures, and grafts of synthetic long-chain polyamides which have repeat amide groups as a substantial constituent in the main polymer chain. Examples of these polyamides are nylon-6 (polycaprolactam), nylon-6,6 (polyhexamethyleneadipamide), nylon-4,6 (polytetramethyleneadipamide), nylon-6,10 (polyhexamethylenesebacimide), nylon-7 (polyenantholactam), nylon-11 (polyundecanolactam), nylon-12 (polydodecanolactam). These polyamides are known by the generic name nylon. For the purposes of the present invention, polyamides also include those known as aramids (aromatic polyamides), such as polymetaphenyleneisophthalimide (NOMEX R Fiber, U.S. Pat. No. 3,287,324), and polyparaphenyleneterephthalamide (KEVLAR R Fiber, U.S. Pat. No. 3,671,542).

The preparation of polyamides may in principle take place by two methods.

During the polymerization of dicarboxylic acids and diamines, or polymerization of amino acids or derivatives of these, such as aminocarboxylic nitrites, aminocarboxamides, aminocarboxylic esters, or aminocarboxylic salts, the amino end groups and carboxy end groups of the starting monomers or starting oligomers react with one another to form an amide group and, for example, water. The water can then be removed from the polymer. During the polymerization of aminocarboxamides, the amino and amide end groups of the starting monomers or starting oligomers react with one another to form an amide group and ammonia. The ammonia can then be removed from the polymer. During the polymerization of aminocarboxylic esters, the amino and ester end groups of the starting monomers or starting oligomers react with one another to form an amide group and an alcohol. The alcohol can then be removed from the polymer. During the polymerization of aminocarboxylic nitrites the nitrile groups may firstly be reacted with water to give amide groups or carboxylic acid groups, and the resultant aminocarboxamides or aminocarboxylic acids can be reacted as described. This polymerization reaction is usually termed polycondensation.

The polymerization of lactams as starting monomers or starting oligomers is usually termed polyaddition.

The polyamides can be obtained by processes known per se, for example those described in DE-A-14 95 198, DE-A-25 58 480, EP-A-129 196 or in: Polymerization Processes, Interscience, New York, 1977, pp. 424-467, in particular pp. 444-446, from monomers selected from the group consisting of lactams, omega-aminocarboxylic acids, omega-aminocarbonitriles, omega-aminocarboxamides, omega-aminocarboxylic salts, omega-aminocarboxylic esters, equimolar mixtures of diamines and dicarboxylic acids, dicarboxylic acid/diamine salts, dinitriles and diamines, or mixtures of these monomers.

Monomers which may be used are
in the form of monomer or oligomer, a $C_2$-$C_{20}$, preferably $C_2$-$C_{18}$, arylaliphatic or preferably aliphatic lactam, examples being enantholactam, undecanolactam, dodecanolactam or caprolactam,
in the form of monomer or oligomer, $C_2$-$C_{20}$, preferably $C_3$-$C_{18}$, aminocarboxylic acids, examples being 6-aminocaproic acid, 11-aminoundecanoic acid, and the salts of these, such as alkali metal salts, e.g. lithium salts, sodium salts, potassium salts,
in the form of monomer or oligomer, $C_2$-$C_{20}$, preferably $C_3$-$C_{18}$, aminocarbonitriles, examples being 6-aminocapronitrile, 11-aminoundecanonitrile,
in the form of monomer or oligomer, $C_2$-$C_{20}$ aminocarboxamines, examples being 6-aminocapramide, 11-aminoundecanoamide,
esters, preferably $C_1$-$C_4$-alkyl esters, e.g. methyl, ethyl, n-propyl, isopropyl, n-butyl, isobutyl, sec-butyl esters, of $C_2$-$C_{20}$, preferably $C_3$-$C_{18}$, aminocarboxylic acids, examples being 6-aminocaproates, such as methyl 6-aminocaproate, 11-aminoundecanoates, such as methyl 11-aminoundecanoate,
in the form of monomer or oligomer, a $C_2$-$C_{20}$, preferably $C_2$-$C_{12}$, alkyldiamine, such as tetramethylenediamine or preferably hexamethylenediamine,
with a $C_2$-$C_{20}$, preferably $C_2$-$C_{14}$, aliphatic dicarboxylic acid or its mono- or dinitrile, examples being sebacic acid, dodecanedioic acid, adipic acid, sebaconitrile, decanonitrile, or adiponitrile,
in the form of monomer or oligomer, a $C_2$-$C_{20}$, preferably $C_2$-$C_{12}$, alkyldiamine, examples being tetramethylenediamine or preferably hexamethylenediamine, with a $C_8$-$C_{20}$, preferably $C_8$-$C_{12}$, aromatic dicarboxylic acid or derivatives thereof, such as chlorides, examples being 2,6-naphthalenedicarboxylic acid, and preferably isophthalic acid or terephthalic acid, in the form of monomer or oligomer, a $C_2$-$C_{20}$, preferably $C_2$-$C_{12}$, alkyldiamine, examples being tetramethylenediamine or preferably hexamethylenediamine, with a $C_9$-$C_{20}$, preferably $C_9$-$C_{18}$, arylaliphatic dicarboxylic acid or derivatives thereof, such as chlorides, examples being o-, m- or p-phenylenediacetic acid, in the form of monomer or oligomer, a $C_6$-$C_{20}$, preferably $C_6$-$C_{10}$, aromatic diamine, examples being m- and p-phenylenediamine, with a $C_2$-$C_{20}$, preferably $C_2$-$C_{14}$, aliphatic dicarboxylic acid or mono- or dinitriles thereof, examples being sebacic acid, dodecanedioic acid, adipic acid, sebaconitrile, decanonitrile, or adiponitrile, aromatic diamine in the form of monomer or oligomer, a $C_6$-$C_{20}$, preferably $C_6$-$C_{10}$, aromatic diamine, examples being m- and p-phenylenediamine, with a $C_8$-$C_{20}$, preferably $C_8$-$C_{12}$, aromatic dicarboxylic acid or derivatives thereof, such as chlorides, examples being 2,6-naphthalenedicarboxylic acid, and preferably isophthalic acid or terephthalic acid, in the form of monomer or oligomer, a $C_6$-$C_{20}$, preferably $C_6$-$C_{10}$, aromatic diamine, examples being m- and p-phenylenediamine, with a $C_9$-$C_{20}$, preferably $C_9$-$C_{18}$, arylaliphatic dicarboxylic acid or derivatives thereof, such as chlorides, examples being o-, m-, and p-phenylenediacetic acid, arylaliphatic diamine in the form of monomer or oligomer, a $C_7$-$C_{20}$, preferably $C_8$-$C_{18}$, arylaliphatic diamine, examples being m- and p-xylylenediamine, with a $C_2$-$C_{20}$, preferably $C_2$-$C_{14}$, aliphatic dicarboxylic acid or mono- or dinitriles thereof, examples being sebacic acid, dodecanedioic acid, adipic acid, sebaconitrile, decanonitrile, and adiponitrile, in the form of monomer or oligomer, a $C_7$-$C_{20}$, preferably $C_8$-$C_{18}$, arylaliphatic diamine, examples being m- and p-xylylenediamine, with a $C_6$-$C_{20}$, preferably $C_6$-$C_{10}$, aromatic dicarboxylic acid or derivatives thereof, such as chlorides, examples being 2,6-naphthalenedicarboxylic acid, or preferably isophthalic acid or terephthalic acid, in the form of monomer or oligomer, a $C_7$-$C_{20}$, preferably $C_8$-$C_{18}$, arylaliphatic diamine, examples being m- and p-xylylenediamine, with a $C_9$-$C_{20}$, preferably $C_9$-$C_{18}$, arylaliphatic dicarboxylic acid or derivatives thereof, such as chlorides, examples being o-, m-, and p-phenylenediacetic acid, and also homopolymers, copolymers, mixtures, and grafts of these starting monomers or starting oligomers.

Particular oligomers which may be used are the dimers, trimers, tetramers, pentamers, or hexamers of the monomers mentioned, or of mixtures of these monomers.

In one preferred embodiment, the lactam used is caprolactam, the diamine used comprises tetramethylenediamine, hexamethylenediamine, or a mixture of these, and the dicarboxylic acid used comprises adipic acid, sebacic acid, dodecanedioic acid, terephthalic acid, isophthalic acid, or a mixture of these. Caprolactam is particularly preferred as lactam, as are hexamethylenediamine as diamine and adipic acid or terephthalic acid or a mixture of these as dicarboxylic acid.

Particular preference is given here to those starting monomers or starting oligomers which during the polymerization give the polyamides nylon-6, nylon-6,6, nylon-4,6, nylon-6,10, nylon-6,12, nylon-7, nylon-11, nylon-12 or the aramids polymetaphenyleneisophthalamide or polyparaphenyleneterephthamide, in particular to those which give nylon-6 or nylon-6,6.

In one preferred embodiment, use may be made of one or more chain regulators during preparation of the polyamides.

Compounds which may be used advantageously as chain regulators are those which have one or more, for example two, three, or four, and in the case of systems in the form of fibers preferably two, amino groups reactive in polyamide formation, or one or more, for example two, three, or four, and in the case of systems in the form of fibers preferably two, carboxy groups reactive in polyamide formation.

In the first case the result is polyamides in which the monomers and chain regulators used to prepare the polyamide have more of the amine groups used to form the polymer chain, or of their equivalents, than of carboxylic acid groups used to form the polymer chain, or their equivalents.

In the second case the result is polyamides in which the monomers and chain regulators used to prepare the polyamide have more of the carboxylic acid groups used to form the polymer chain, or of their equivalents, than of amine groups used to form the polymer chain, or their equivalents.

Chain regulators which may be used with advantage are monocarboxylic acids, examples being alkanecarboxylic acids, such as acetic acid and propionic acid, and other examples being a benzene- or naphthalenemonocarboxylic acid, such as benzoic acid, and dicarboxylic acids, such as $C_4$-$C_{10}$ alkanedicarboxylic acid, e.g. adipic acid, azelaic acid, sebacic acid, dodecanedioic acid, $C_5$-$C_8$ cycloalkanedicarboxylic acid, for example cyclohexane-1,4-dicarboxylic acid, or a benzene- or naphthalenedicarboxylic acid, such as terephthalic acid, isophthalic acid, naphthalene-2,6-dicarboxylic acid, and $C_2$-$C_{20}$, preferably $C_2$-$C_{12}$, alkylamines, such as cyclohexylamine, $C_6$-$C_{20}$, preferably $C_6$-$C_{10}$, aromatic monoamines, such as aniline, or $C_7$-$C_{20}$, preferably $C_8$-$C_{18}$, arylaliphatic monoamines, such as benzylamine, and $C_4$-$C_{10}$ alkanediamines, e.g. hexamethylenediamine.

The chain regulators may be unsubstituted or substituted, for example with aliphatic groups, preferably $C_1$-$C_8$-alkyl groups, such as methyl, ethyl, isopropyl, n-propyl, n-butyl, isobutyl, sec-butyl, n-pentyl, n-hexyl, n-heptyl, n-octyl, 2-ethylhexyl, OH, =O, $C_1$-$C_8$-alkoxy, COOH, $C_2$-$C_6$-carbalkoxy, $C_1$-$C_{10}$-acyloxy, or $C_1$-$C_8$-alkylamino, or sulfonic acid or salts thereof, such as alkali metal or alkaline earth metal salts, cyano, or halogens, such as fluorine, chlorine, bromine. Examples of substituted chain regulators are sulfoisophthalic acid, the alkali metal or alkaline earth metal salts thereof, such as the lithium salts, sodium salts, or potassium salts, sulfoisophthalic esters, for example those with $C_1$-$C_{16}$ alkanols, and sulfoisophthalic mono- or diamides, in particular with monomers suitable for forming polyamides and bearing at least one amino group, for example hexamethylenediamine or 6-aminocaproic acid.

Chain regulators used with preference are sterically hindered piperidine derivatives of the formula

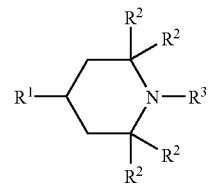

where
$R^1$ is a functional group capable of amide formation with respect to the polymer chain of the polyamide, preferably a —(NH)$R^5$ group, where $R^5$ is hydrogen or $C_1$-$C_8$-alkyl, or is a carboxy group or a carboxy derivative or a —(CH$_2$)$_x$(NH)$R^5$ group where X is from 1 to 6 and $R^5$ is hydrogen or $C_1$-$C_8$-alkyl, or is a —(CH$_2$)$_y$COOH group where Y is from 1 to 6, or is an acid derivative of —(CH$_2$)$_y$COOH where Y is from 1 to 6, and in particular is an —NH$_2$ group, $R^2$ is an alkyl group, preferably a $C_1$-$C_4$-alkyl group, such as methyl, ethyl, n-propyl, isopropyl, n-butyl, isobutyl, sec-butyl, in particular a methyl group, $R^3$ is hydrogen, $C_1$-$C_4$-alkyl, or O—$R^4$, where $R^4$ is hydrogen or $C_1$-$C_7$-alkyl, and in particular $R^3$ is hydrogen.

In compounds of this type, steric hindrance usually prevents reaction of the tertiary, and in particular the secondary, amino groups of the piperidine ring system.

A particularly preferred sterically hindered piperidine derivative is 4-amino-2,2,6,6-tetramethylpiperidine.

A chain regulator may be used advantageously in amounts of at least 0.001 mol %, preferably at least 0.01 mol %, in particular at least 0.03 mol %, particularly preferably at least 0.08 mol %, based on 1 mole of amide groups of the polyamide.

A chain regulator may advantageously be used in amounts of not more than 2.0 mol %, preferably not more than 1 mol %, in particular not more than 0.6 mol %, particularly preferably not more than 0.5 mol %, based on 1 mole of amide groups of the polyamide.

According to the invention, the polyamide contains a compound which bears at least one hydroxy group and has chemical bonding by way of an amide group to the end of the polymer chain.

For the purposes of the present invention, the expression compound which bears at least one hydroxy group also means a mixture of such compounds which bears at least one hydroxy group.

The compound which bears at least one hydroxy group may bear one or more, for example 2, 3, 4, 5 or 6 hydroxy groups, preferably 1, 2 or 3 hydroxy groups, in particular one hydroxy group.

The compound used which bears at least one hydroxy group is advantageously a monocarboxylic acid which bears at least one hydroxy group.

The compound used which bears at least one hydroxy group is advantageously a monoamine which bears at least one hydroxy group.

The compound used which bears at least one hydroxy group may advantageously be a compound which bears at least one terminal hydroxy group.

If the compound which bears at least one hydroxy group is a monoamine which bears at least one hydroxy group, use may in particular be made of a linear, unbranched alkanemonoamine.

If the compound which bears at least one hydroxy group is a monocarboxylic acid which bears at least one hydroxy group, use may in particular be made of a linear, unbranched alkanemonocarboxylic acid, particularly preferably one of the formula

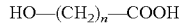

HO—$(CH_2)_n$—COOH where n=1, 2, 3, 4, 5, 6, 7, 8, 9, 10, 11, 12, 13, 14, or 15, in particular n=5.

These monocarboxylic acids which bear at least one hydroxy group are known per se, as is their preparation.

These monoamines which bear at least one hydroxy group are known per se, as is their preparation.

The content of the compound which bears at least one hydroxy group may advantageously be at least 0.001 mol %, preferably at least 0.01 mol %, in particular at least 0.03 mol %, particularly preferably at least 0.08 mol %, based on 1 mole of amide groups of the polyamide.

The content of the compound which bears at least one hydroxy group may advantageously be not more than 2.0 mol %, preferably not more than 1 mol %, in particular not more than 0.6 mol %, particularly preferably not more than 0.5 mol %, based on 1 mole of amide groups of the polyamide.

The polyamides of the invention can be obtained by reacting monomers, oligomers, or mixtures of these suitable for forming a polyamide to give a polyamide in the presence of a compound which bears at least one hydroxy group or a compound which under the reaction conditions for preparing the polyamide makes available the compound which bears at least one hydroxy group.

The compound used under the reaction conditions for preparing the polyamide to make available the monocarboxylic acid which bears at least one hydroxy group may be one where at least one of the hydroxy groups is made available under the reaction conditions. The compounds may also be those where the carboxylic acid group is made available under the reaction conditions, for example nitriles, esters, or amides. The compounds used under the reaction conditions for preparing the polyamide to make available the monocarboxylic acid which bears at least one hydroxy group may also be a compound where at least one of the hydroxy groups and the carboxylic acid group are made available under the reaction conditions.

The compound used under the reaction conditions for preparing the polyamide to make available the monoamine which bears at least one hydroxy group may be a compound where at least one of the hydroxy groups is made available under the reaction conditions. Use may also be made of compounds where the amine group is made available under the reaction conditions, for example amides. Other compounds which can be used under the reaction conditions for preparing the polyamide to make available the monoamine which bears at least one hydroxy group are those where at least one hydroxy group and the amine group are made available under the reaction conditions.

To prepare the polyamides of the invention, use may be made of the conventional process conditions for preparing polyamides from the corresponding monomers, for example as described in DE-A-14 95 198, DE-A-25 58 480, EP-A-129 196, DE-A-19 709 390, DE-A-35 34 817, WO 99/38908, WO 99/43734, WO 99/43732, WO 00/24808, WO 01/56984 or in Polymerization Processes, Interscience, New York, 1977, pp. 424-467, in particular pp. 444-446.

In one preferred embodiment, the polymerization or polycondensation may be carried out by the process of the invention in the presence of at least one pigment. Preferred pigments are titanium dioxide, preferably in the anatase or rutile crystalline form, or inorganic or organic colorant compounds. The pigments are preferably added in amounts of from 0 to 5 parts by weight, in particular from 0.02 to 2 parts by weight, based in each case on 100 parts by weight of polyamide. The pigments may be introduced to the reactor with the starting materials or separately therefrom.

The polyamides of the invention may be used advantageously for producing fibers, films, or moldings which comprise this polyamide, or in particular consist of this polyamide.

EXAMPLES

In the examples, solution viscosity was measured as relative solution viscosity in 96% sulfuric acid to DIN 51562-1 to -4.

For this, 1 g of polymer was weighed out for 100 ml of solution, and the throughflow time was measured in a Ubbelohde viscometer in comparison with the pure solvent.

Example 1

350 g (3.1 mol) of caprolactam, 35 g of demineralized water, and 1.6 g (8*10-3 mol) of 6-hydroxycaproic acid (purity 95%) were heated under nitrogen to an internal temperature of 270° C. in a laboratory autoclave, and then immediately depressurized to atmospheric pressure within one hour, post-condensed for 60 minutes, and discharged.

The discharged polyamide was granulated, extracted with boiling water to remove caprolactam and oligomers, and then dried in a vacuum drying cabinet. The dried extracted granules were heat-conditioned for various times in the solid phase at 160° C. (5 h, 10 h, 20 h, 30 h).

Table 1 below shows the resultant relative solution viscosities after various heat-conditioning times.

TABLE 1

| | Heat conditioning time | | | | |
|---|---|---|---|---|---|
| | 0 h | 10 | 15 h | 20 h | 30 h |
| Relative solution viscosity | 2.47 | 2.74 | 2.83 | 2.86 | 3.00 |

Example 2

The melt behavior of four polyamide specimens from Example 1 was studied. For this, oscillatory shear measurements were made at 250° C. and melt viscosity measurements were carried out to ISO 11433. The zero-shear viscosity $\eta_0$, i.e. the melt viscosity at zero shear, is a function of the molar mass Mn for linear polyamides with Schulz-Flory distribution:

$$\eta_0 \sim M_n^{3.5}$$

The molar mass was determined by light scattering. FIG. 1 shows that the polyamides prepared as in Example 1 are linear:

Example 3

Example 1 was repeated in a pressure vessel using the following mixture: 400 kg (3571 mol) of caprolactam, 40 kg of demineralized water, and 1.06 kg (8 mol) of 6-hydroxycaproic acid. The polyamide discharged was extracted, dried, and heat-conditioned in the solid phase to a relative solution viscosity of RV=2.72.

An extruder was then used to compound 30% by weight of OCF 123 D 10 P glass fibers (from OCF) and 7% by weight of Lupolen KR 1270 rubber (from BASF Aktiengesellschaft) into the material (the percentages being based on the finished compounded material). The relative solution viscosity after compounding was 2.80.

Comparative Example

Example 3 was repeated with the modification that 0.592 kg (8 mol) of propionic acid was used instead of 6-hydroxycaproic acid.

The relative solution viscosity after compounding was 2.79.

Melt volume rate (MVR) measurement to ISO 1133

Melt volume rate (MVR) measurements were carried out to ISO 1133 on the compounded materials from Example 3 and from the comparative examples. The melt temperature here was 275° C. and the ram weight was 5 kg.

Figure 2:
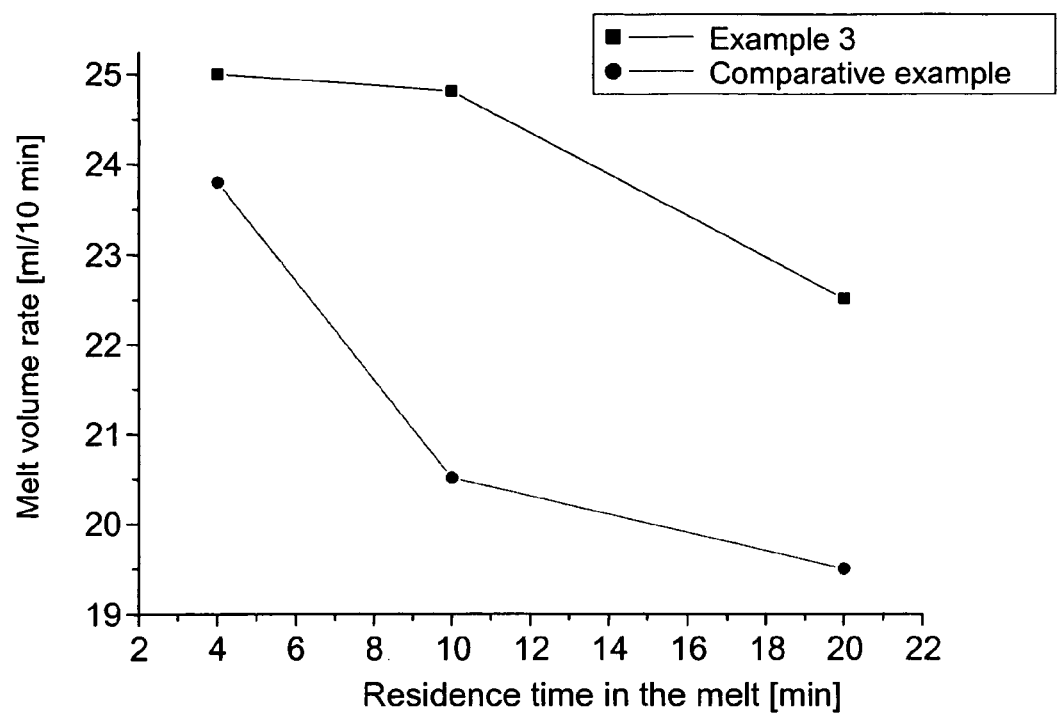
FIG. 2 shows the comparison of the melt volume rate for various residence times in the melt for Example 3 and the comparative example.

FIG. 2 shows the comparison of the melt volume rate for various residence times in the melt.

Flowability in two types of flow spirals (diameter 1.5 mm, 2 mm) was tested on the compounded materials from Example 3 and the comparative example. The temperature of the spirals was 280° C. Flow path was measured in cm. Table 2 below shows the measurements:

TABLE 2

| | Example 4 | Comparative example |
|---|---|---|
| Flow spiral (1.5 mm) | 26.9 cm | 24.5 cm |
| Flow spiral (2 mm) | 41.4 cm | 38.8 cm |

The invention claimed is:

1. A process for preparing a polyamide consisting essentially of the following steps:
   providing monomeric or oligomeric units selected from the group consisting of arylaliphatic lactam aliphatic lactam, aminocarboxylic acid, and aminocarbonitrile;
   providing an unbranched alkanemonocarboxylic acid having the formula HO—$(CH_2)_n$—COOH, wherein n=1, 2, 3, 4, 5, 6, 7, 8, 9, 10, 11, 12, 13, 14, or 15; and
   polymerizing the monomeric or oligomeric units in the presence of the unbranched alkanemonocarboxylic acid to provide a polyamide that is end-capped with an unbranched alkane having at least one terminal hydroxyl group,
   wherein the unbranched alkanemonocarboxylic acid is present in the range from 0.001 to 2 mol %, based on 1 mole of amide groups of the polyamide.

2. The process as claimed in claim 1, where the unbranched monocarboxylic acid has the formula HO—$(CH_2)_5$—COOH.

3. The process as claimed in claim 1, wherein the monomeric or oligomeric units are selected from the group consisting of arylaliphatic lactam and aliphatic lactam.

4. The process as claimed in claim 3, where the monomeric or oligomeric units are selected from the group consisting of enantholactam, undecanolactam, dodecanolactam, and caprolactam.

5. The process as claimed in claim 3, where the monomeric or oligomeric units are based on caprolactam and the polyamide is end-capped by the reaction of 6-hydroxycaproic acid.

6. The process as claimed in claim 1, further comprising carrying out the polymerizing in the presence of an inorganic or organic pigment.

7. The process as claimed in claim 1, where the monomeric or oligomeric units are based on caprolactam and the unbranched alkanemonocarboxylic acid is 6-hydroxycaproic acid.

* * * * *